June 26, 1956   R. J. ROBERTS   2,751,915
AUTOMATIC VEHICLE WASHING DEVICE
Filed Dec. 3, 1953   2 Sheets-Sheet 1

Roy J. Roberts
INVENTOR.

BY
*Clarence A. O'Brien*
*and Harvey B. Jackson*
Attorneys

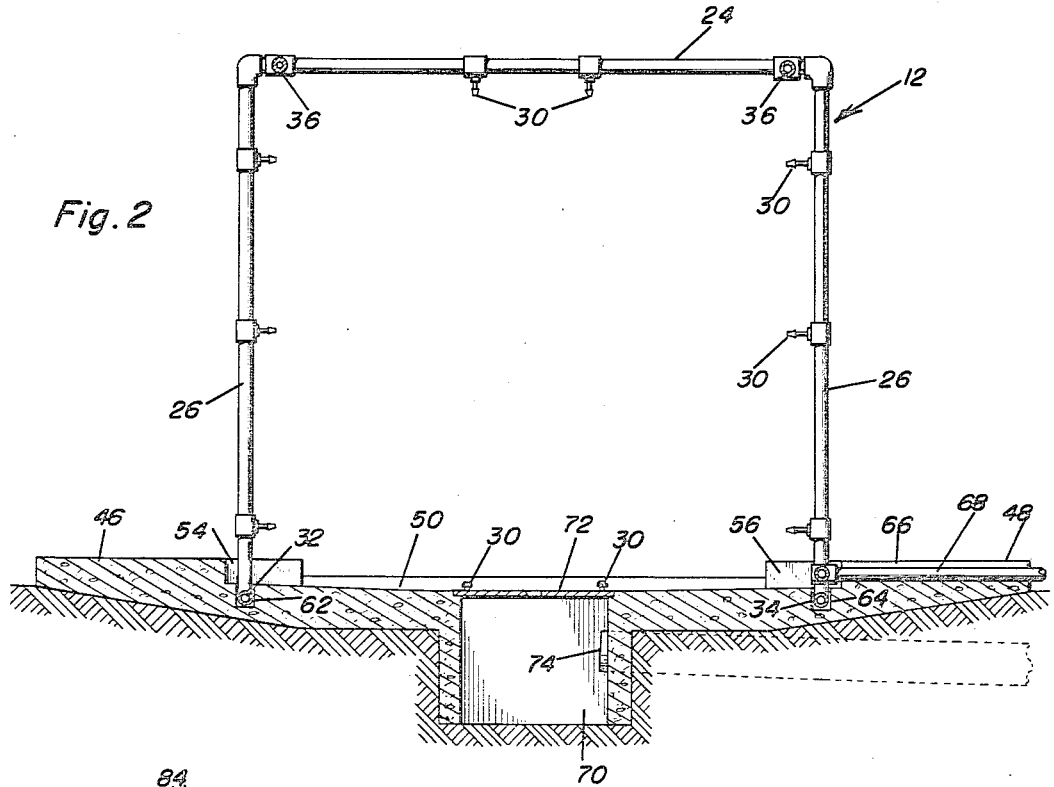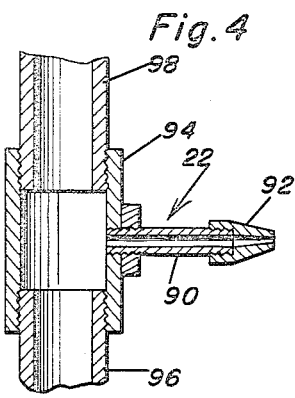

United States Patent Office 2,751,915
Patented June 26, 1956

2,751,915
AUTOMATIC VEHICLE WASHING DEVICE

Roy J. Roberts, Corpus Christi, Tex.

Application December 3, 1953, Serial No. 395,983

3 Claims. (Cl. 134—123)

This invention relates in general to improvements in washing equipment, and more specifically to an improved vehicle washing device.

The primary object of this invention is to provide an improved vehicle washing device of the type which is automatic in operation and which may be quickly and easily set into operation through the use of a coin operated control.

Another object of this invention is to provide an improved vehicle washing device which includes piping and spray nozzles so arranged whereby a vehicle may be slowly driven through the device and be thoroughly cleaned thereby.

Another object of this invention is to provide an improved vehicle device which includes a supporting frame in the form of piping for spray nozzles, a portion of the supporting frame being intended to be driven over by a vehicles so that the underside thereof may be thoroughly washed.

A further object of this invention is to provide an improved vehicle washing device which includes a frame including a plurality of spray nozzles, the frame being mounted with respect to guideways and having vertical portions thereof protected thereby.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged transverse vertical sectional view taken substantially upon the plane indicated by the section line 2—2 of Figure 1 and shows the general cross-section of the vehicle washing device;

Figure 3 is the wiring diagram for the vehicle washing device of Figure 1; and

Figure 4 is an enlarged fragmentary sectional view taken through a portion of one of the frames of the vehicle washing device and shows the general construction of and the manner in which a spray nozzle is mounted.

Figure 1:
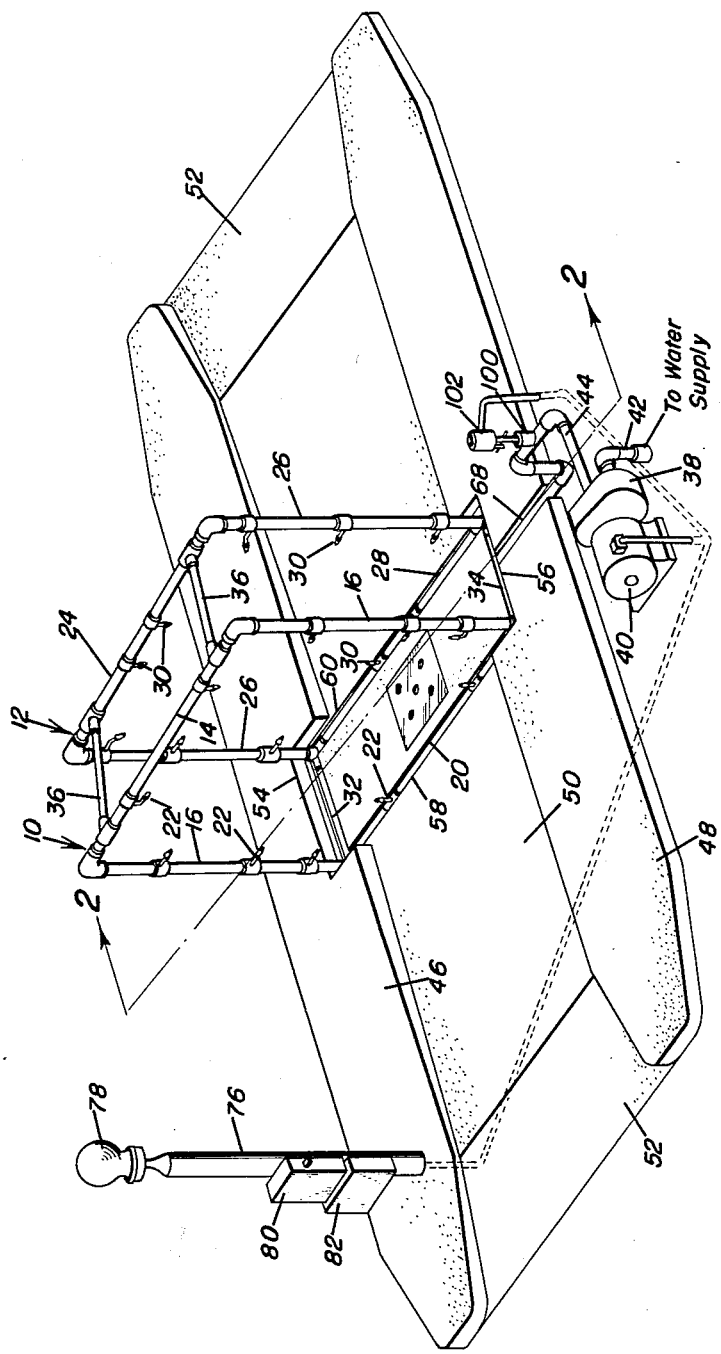
Figure 1 is a perspective view of the vehicle washing device which is the subject of this invention and shows the general outline of the same.

Referring now to the drawings in detail, it will be seen that the vehicle washing device includes a pair of spaced parallel frames which are referred to in general by the reference numerals 10 and 12. Each of the frames 10 and 12 is rectangular in outline with the frame 10 including an upper horizontal member 14, vertical members 16 and a lower horizontal member 20. Carried by each of the members of the frame 10 is a plurality of spray nozzles 22.

The frame 12, which is disposed immediately adjacent the frame 10 includes an upper horizontal member 24, vertical members 26 and a lower horizontal member 28. Carried by the members of the frame 12 are spray nozzles 30.

The lower corners of the frames 10 and 12 are connected together by pipings 32 and 34. The upper horizontal members 14 and 24 are also connected together by piping 36.

Disposed adjacent the frames 10 and 12 is a pump 38 which is driven by an electric motor 40. The pump 38 is provided with an inlet pipe 42 which is connected to a water supply source. The pump 38 is also provided with an outlet 44 which is connected to the pipe 34 whereby water may be conveniently pumped into the frames 10 and 12, the pipes 32, 34 and 36 communicating the two frames 10 and 12.

The vehicle washing device includes a pair of guideways 46 and 48 which are disposed on opposite sides of a driveway 50. The driveway 50 includes a ramp portion 52 at each end and slopes downwardly towards the center thereof. The frames 10 and 12 are disposed at substantially the center of the driveway 50 and extend transversely thereof between the guideways 46 and 48.

In order to protect the vertical members 16 and 26 of the frames 10 and 12, respectively, against damage by a vehicle being washed when driven through the frames 10 and 12, the guideways 46 and 48 are provided with notches 54 and 56, respectively, in which the lower portions of the frames 10 and 12 are located. Thus, it will be seen that the vertical members 16 and 26 are clearly protected against damage.

The central portion of the driveway 50 is provided with a transverse groove 58 in which is seated the lower horizontal member 20. A second transverse groove 60 has seated therein the lower horizontal member 28. It will be understood that although the horizontal members 20 and 28 are seated in their respective grooves, their nozzles 22 and 30, respectively, project upwardly for spraying water on the underside of a vehicle.

The driveway 50 is also provided with longitudinally extending grooves 62 and 64 which are disposed within the general confines of the notches 54 and 56, respectively. Received in the grooves 62 and 64 are the pipes 32 and 34, respectively. The guideway 48 is also provided with a groove extending transversely thereof, the groove being referred to by the reference numeral 66 and having passing therethrough piping 68 which connects the pipe 34 to the outlet 44 of the pump 38.

It will be noted that the driveway 50 slopes towards the exact center thereof. Disposed at the center of the driveway 50 between the lower portions of the frames 10 and 12 is a drain sump 70 which is covered by a removable plate 72. The drain sump 72 is also provided with a drain pipe 74.

Carried by the guideway 46 adjacent one end thereof is a standard 76 which has mounted at the upper end thereof a light 78. Mounted on the standard 76 intermediate its ends is a coin operated control switch 80. Also carried by the standard 76 immediately below the coin operated control switch 80 is an electrical timing device 82.

Referring now to Figure 3 in particular, it will be seen that the timing device 82 is connected to an electrical circuit by wires 84. Further, the coin controlled switch 80 is connected to the timing device 82 by electric wires 86. The timing device is also connected to the electric motor 40 of the pump 38 by wires 88.

When it is desired to operate the vehicle washing device which is the subject of this invention, one drives his car up on the driveway 50 between the ends of the guideways 46. Then, upon the insertion of a suitable coin in the coin controlled switch by the operator of the car while still seated in the car, the pump 38 is actuated. It will be understood that the coin controlled switch 80 is so positioned relative to the frames 10 and 12, that the front portion of a vehicle positioned between the guideways 46 and 48 so that the driver thereof may reach the coin controlled switch 80 is disposed in underlying relation with respect to the frames 10 and 12. Therefore, as soon as the pump 38 starts, the front portion of the vehicle is being washed. The operator of the vehicle then winds up his window and proceeds to drive slowly through the confines of the frames 10 and 12. Inasmuch as all of the spray nozzles of the frames 10 and 12 are arranged in staggered relation, it will be seen that the vehicle passing through the frames 10 and 12 will be efficiently sprayed so as to effectively wash the same.

Referring now to Figure 4 in particular, it will be seen that there is illustrated a spray nozzle which, although being indicated as being the spray nozzle 22, may be either a spray nozzle 22 or a spray nozzle 30, the two spray nozzles being identical. The spray nozzle 22 includes a short length of pipe 90 which has threadedly engaged on one end thereof a spray head 92. The other end of the pipe 90 is threadedly engaged in a special fitting 94 which is carried by ends of piping 96 and 98. It will be understood that the piping 96 and 98 form a part of the associated frame.

Inasmuch as it is intended that the pump 38 be connected to a pressurized water supply, such as a city water supply, it is necessary that there be provided means for shutting off the flow of water when the pump 38 is not operating. Therefore, the piping 68 connecting the frames 10 and 12 to the outlet 44 of the pump is provided with a shut-off valve 100. The shut-off valve 100 is actuated by an electromagnetic actuating device 102. The electromagnetic actuating device 102 is connected by wires 104 to two of the wires 88 for controlling the operation of the motor 40. Thus, it will be seen that the shut-off valve 100 will be opened only when the electric motor 40 is running to operate the pump 38. When the electric motor 40 is turned off by the timing device 82, the electromagnetic device 102 will be released so as to permit the closing of the shut-off valve 100, which is preferably spring loaded.

In view of the foregoing, it will be seen that there has been devised a novel vehicle washing device which is automatic in its operation after being first actuated and which is so constructed and designed whereby a person seated in a car desired to be washed may conveniently drive into the vehicle washing device, deposit the necessary coin to actuate the vehicle washing device, and then, by slowly driving therethrough, has his car completely washed. Inasmuch as the vehicle washing device is relatively simple in construction and requires no attendant, it will be seen that the charge for washing cars therewith may be very nominal.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A vehicle washer comprising a rectangular frame, said frame being formed of a plurality of intercommunicated pipes, each of said pipes being provided with inwardly directed nozzles, pump means connected to said frame, means for controlling operation of said pump, said frame including a lower horizontal pipe, nozzles carried by said lower horizontal pipe being intended to pass under a vehicle for washing the underside thereof, a pair of guideways, said frame extending transversely of said guideways and therebetween, vertical portions of said frame extending upwardly from notches in said guideways, said vertical portions being protected by said guideways.

2. A vehicle washer comprising a pair of spaced parallel rectangular frames, each of said frames being formed of a plurality of intercommunicated pipes, each of said pipes being provided with inwardly directed nozzles, the nozzles of one frame being staggered relative to the nozzles of the other frame, pump means connected to said frames for supplying water to said nozzles, bracing interconnecting said frames, said bracing being in the form of piping, said bracing communicating said frames.

3. A vehicle washer comprising a pair of spaced parallel rectangular frames, each of said frames being formed of a plurality of intercommunicated pipes, each of said pipes being provided with inwardly directed nozzles, the nozzles of one frame being staggered relative to the nozzles of the other frame, pump means connected to said frames for supplying water to said nozzles, a pair of guideways, said frames extending between and transversely of said guideways, vertical portions of said frames extending upwardly from notches in said guideways, said vertical portions being protected by said guideways.

References Cited in the file of this patent

UNITED STATES PATENTS

| | | |
|---|---|---|
| 1,743,815 | Gilburg | Jan. 14, 1930 |
| 2,102,372 | Mills | Dec. 14, 1937 |
| 2,221,876 | Mackin | Nov. 19, 1940 |
| 2,648,342 | Vani et al. | Aug. 11, 1953 |

FOREIGN PATENTS

| | | |
|---|---|---|
| 478,652 | Canada | Nov. 20, 1951 |